3,528,784
METHOD FOR PRELIMINARY BENEFICIATION OF CALCAREOUS OXIDIZED COPPER ORES BY FLOTATION OF A HIGH ACID-CONSUMING FRACTION CONTAINING LOW COPPER VALUES FROM A LOW ACID-CONSUMING FRACTION CONTAINING HIGHER COPPER VALUES
George E. Green, Tucson, Ariz., assignor to Banner Mining Company, Tucson, Ariz., a corporation of Arizona
No Drawing. Filed Mar. 21, 1968, Ser. No. 714,775
Int. Cl. B01d *11/02;* B03d *1/00, 1/08*
U.S. Cl. 23—312         12 Claims

ABSTRACT OF THE DISCLOSURE

The high acid-consuming fraction of a finely divided calcareous oxidized copper ore is separated by flotation from the low acid-consuming fraction, and the major part of the copper minerals is caused to report in the low acid-consuming fraction. The copper values can then be removed from the tails by leaching with a dilute acid.

BACKGROUND OF THE INVENTION

The major copper reserves in the world exist as disseminated deposits in arid regions, and while the bulk of world copper production is derived from sulphide ores, these sulphide bodies are invariably overlain by oxidized zones in which the minerals have been converted to various oxidized compounds by the action of atmospheric oxygen, temperature changes, and surficial ground waters. In the case of copper mineralization, the resultant minerals commonly occur as chrysocolla (copper silicate), malachite and azurite (copper carbonates) and cuprite and tenorite (copper oxides). Most of the world's present and future production of copper will be made by the open-pit method of mining. In this mining system, it is necessary to remove the overlying oxidized zone in order to expose the underlying sulphide mineralization.

In many deposits, the copper present in rocks removed from the oxidized zone is readily recoverable by leaching with dilute sulphuric acid or acid ferric sulphate, but enormous deposits exist in which calcium compounds, chiefly calcium carbonate (limestone) and calcium-magnesium carbonate (dolomite), is present in sufficient amount, and of suitable character chemically and physically, to react with the leaching acid to such a degree that recovery of copper by this means is not economical or practical. There are also many oxidized deposits from which the copper values can be extracted at a profit during periods of high metal prices, but with undesirably high acid costs due to high calcium content and with a concomitant high production of calcium sulphate in leaching slurries which results in undesirable operating conditions. In addition, there are many partially oxidized, or mixed deposits which contain small copper values (0.3%–0.5% copper) in oxidized form plus small copper values (0.3%–0.5% copper) in sulphide form.

When such deposits do not contain sufficient sulphide copper to pay the costs of the operation and when the calcium content is too high to permit economical leaching of oxidized copper minerals, the entire deposit is of no commercial value. Because the major part of the copper values in all the above-cited instances of oxidized and partially oxidized or mixed copper ores occur as copper silicates which are not readily attacked by cyanides or ammonium compounds to an extent that could be termed leaching, as of the present time these copper deposits have not been classifiable as reserves or commercial ores and have had no definitely potential value.

SUMMARY

The present invention pertains to a method for the separation of those calcium-containing gangue particles which react readily with cold dilute sulphuric acid (less than 10% $H_2SO_4$) from those gangue particles which do not readily react with dilute sulphuric acid and the latter non-reacting particles may or may not be compounds which contain calcium in their molecular structure. More particularly, the present invention comprises a flotation process in which the ore, previously properly ground and conditioned, is separated into two fractions; one, a float product of smaller bulk containing copper values of lower assay value than the original ore and the major part of those calcareous substances which react readily with cold dilute sulphuric acid, and two, a flotation tailings product containing copper values of higher assay value than the original ore and a minor part of those calcareous substances which react readily with dilute sulphuric acid, plus the major part of all non-calcareous substances as well as those calcareous particles which do not readily react with dilute sulphuric acid.

DESCRIPTION OF THE PREFERRED EMBODIMENTS

In oxidized or partially oxidized copper ores which are associated with a gangue that reacts readily with cold dilute sulphuric acid, the principal gangue constituents are silica ($SiO_2$), limestone ($CaCO_3$) and dolomite ($CaCO_3 \cdot MgCO_3$). Silica, or quartz ($SiO_2$) does not react with sulphuric acid, limestone reacts readily with cold dilute sulphuric acid, while dolomite does not react readily with such acid. Dolomite grades into limestone by imperceptible degrees, passing from a pure dolomite through high-and-low-magnesian limestone to pure limestones. This means that we can find a calcium carbonate-magnesium carbonate with a calcium:magnesium ratio of 1:1 atom-wise, or 110:1 or greater or any ratio in-between. I have discovered that while pure dolomite differs from pure limestone in that it does not readily react with cold dilute sulphuric acid, this characteristic of not reacting with cold dilute acid is not limited to pure dolomite but is retained in diminishing degree as the Ca:Mg ratio is increased. I have several observations to confirm this. Using a particular ore in which both dolomites and limestones are known to occur, not much sulphuric acid (less than 100 lbs. acid per ton of solids) was consumed in leaching flotation tailings with 5.6%, 6.0%, 6.4% or 7.2% calcium in the tailings, but at 7.6% calcium the acid consumption began to rise, suddenly and sharply. Also, in flotation separation of such ore, regardless of frequency and amounts of collector reagent additions (within reason) the gangue particles containing calcium carbonate kept floating out in froth until there was about 6.0% Ca left in the tailings, then levitation by flotation practically ceased. If this much calcium were present in tailings as $CaCO_3$, there would be 15% $CaCO_3$ in the tailings and this would readily react with about 300 lbs. of sulphuric acid per ton of solids, but because no reaction took place to this extent, the calcium could not be present as $CaCO_3$. There was 1.2% magnesium in these tailings. If this Mg were all present as a constituent of pure dolomite, there would be 2.0% Ca in the pure dolomite, leaving 4.0% Ca as 10.0% $CaCO_3$ in these tailings, which would be sufficient to react with 200 lbs. of sulphuric acid per ton of solids. Because no reaction to any such extent took place, the necessary conclusion was that the relatively small magnesium content prevented these low-magnesium-high-calcium particles from adhering to bubbles in flotation and also prevents these particles from being readily attacked by cold dilute sulphuric acid. The $CaCO_3 \cdot MgCO_3$ ratio in floated concentrate is 18:1 while the $CaCO_3:MgCO_3$ ratio in flotation tailings is 3.625:1. It follows, then, that a small content of magnesium carbonate is sufficient to render a larger amount of calcium carbonate both non-floatable and insoluble in cold dilute sulphuric acid. Working with my preferred method, as set forth below, I have ascertained that the critical dividing line comes at a $$CaCO_3:MgCO_3$$

ratio of 9:1, that is, any impure dolomitic particle with a $CaCO_3:MgMO_3$ ratio of less than 9:1 will not readily report in the flotation float concentrate product and will not readily react with cold dilute sulphuric acid, while any impure dolomitic particle with a $CaCO_3:MgCO_3$ ratio of more than 9:1 will be readily floated off as flotation concentrate and will readily react with cold dilute sulphuric acid, and the speed or intensity of reaction with acid will increase as the ratio is raised.

The fact that the split in flotation can be made to come at just the proper splitting point for leaching is not a fortuitous coincidence because the preferred collecting reagents in flotation are either an anionic sulphonate or a vegetable fatty acid and a slight reaction between particle and reagent is necessary for promotion of adherence to bubbles in the pulp and froth column.

My preferred method is, in some respects, a complete reversal of normal flotation practices. The valuable constituents, i.e., oxidized copper minerals are not recovered or concentrated as a flotation concentrate, but instead, are depressed and concentrated in the tailings.

It has been universally held, hitherto, as a fundamental fact of flotation of non-metallics, that preliminary removal of slimes is essential. In the present invention, I have found that the reverse is true; slimes (true impalpable slimes) are necessary and attempts at flotation separation of a de-slimed sample yields inferior results. Also, because slime fractions assay 50% higher in copper than does the whole ore, discard of slimes is not feasible. In my preferred method, all slimes are left in the flotation feed where they perform a useful function.

In sulphide flotation, small quantities of collector reagents are used, normally less than 0.15 lbs. per ton of solids, because of mono-molecular layer on the mineral particle is desired for best results. In non-metallic flotation, wherein separations as sharp as those attainable in sulphide flotation are not usually possible, a layer of four molecules minimum thickness is necessary and non-metallic collectors are used in ranges from 0.5 lb. to 4.0 lbs. per ton of solids.

When we are seeking to separate highly calcareous calcium carbonate particles from siliceous particles and/ or particles with considerable magnesium content, the presence of slimes, properly dispersed, composed of colloidal particles of highly calcareous calcium carbonate help materially in building up a thickness of coating on the calcareous granular particles which we wish to float and these highly calcareous slimes are deterred from building up on the siliceous and high-magnesium particles by the specific dispersing agents used.

Another departure from normal flotation practice is that in my preferred method the cleaner cell tailings derived from re-flotation of the concentrate for cleaning, is not re-introduced to the head of rougher flotation, but instead is removed and combined with rougher tailings. This practice, made possible by the fact that such cleaner cell tailings do not retain an excessive proportion of acid-consuming constituents, means a greater copper recovery into the leachable fraction and avoidance of any circulating load which often results in a buildup of undesirable trouble-makers.

My preferred method comprises the following steps.

Calcareous oxidized copper ore (e.g. containing copper silicate, copper carbonate, copper oxide, copper sulfide, silicon dioxide, calcium carbonate, and calcium-magnesium carbonate) is ground in a ball-mill or equivalent grinding device with a closed circuit classification, using soft water, to essentially all minus 48 mesh. The water should have as little dissolved calcium, sodium and iron salts, as possible.

As mentioned hereinabove, the ore is not deslimed. In tests made on ore from which 100% of the minus 200 mesh particles had been removed, very little of the material was floated and there was practically no selection made between mineral particles. Conversely, when the entire ore was ground to minus 200 mesh, all of the ore tended to float with very little selectivity shown.

Further tests (see Schedule I at end of specification) established that copper recovery dropped when the minus 200 mesh fraction decreased from about 45% by weight to about 35%, and that it also dropped when the minus 200 mesh fraction was increased from about 45% to about 50%. Thus, a range of from about 35% to 50% minus 200 mesh is satisfactory, with about 45%, by weight, being preferred.

The slurry is adjusted to a pH of approximately 8.5 (the range of 8.0 to 9.0 being acceptable) using sodium carbonate or sodium hydroxide as the pH modifier, and then conditioned by agitation at 20% solids for five minutes with the addition of 0.5 lb. sodium silicate per ton of solids and 0.5 lb. commercial calcium cyanide (or CN equivalent in sodium cyanide) per ton of solids.

Although the slurry can be conditioned at various percentages of solids content, 20% solids is the preferred density at flotation and therefore it is preferable to use that density throughout the process. For example, flotation at less than 20% solids would entail greater reagent expense, greater capital cost, and more floor space to achieve equivalent residence time.

Tests (Schedules II) have established that a five minute conditioning time is preferred when both high copper recovery and low calcium elimination are considered, but that a range of from about two minutes to about ten is acceptable.

The purpose of the sodium silicate is two-fold, it disperses the slime particles and deters the highly calcareous slimes from adhering to the low calcium and the siliceous particles. Other soluble silicates could be used, such as fluo-silicic acid but sodium silicate is preferred because of its low cost.

Tests (Schedule III) have established that although from about 0.2 to 1.0 lb. sodium silicate per ton produces the desired results, superior all-around results are achieved at the preferred 0.5 lb. per ton.

The purpose of the water-soluble cyanide is three-fold. First, it aids in slime dispersion and it aids in depressing the copper minerals by maintaining a slight surface attack on such minerals, thus preventing collector coatings from forming. Secondly, the dispersing and wetting effects of the cyanide on the copper minerals aid in preventing physical and mechanical entrapment of copper mineral particles in ascending bubble columns during flotation. And thirdly, the tough persistant froth produced by sulphonates or vegetable fatty acids tends to break down rapidly in launders after removal from flotation cells, when cyanide is used.

It has also been established (Schedule IV) that while from about 0.1 to about 1.0 lb. calcium cyanide is a workable range, with more latitude at the upper end, about 0.5 lb. per ton is optimum. Thus, below about 0.1 lb. calcium cyanide is too low for good copper recovery and above about 1.0 lb. per ton causes excessive depression of calcium minerals, cyanides other than calcium cyanide or sodium cyanide can be used, but calcium cyanide is preferred for reasons of economy. Because commercial calcium cyanide is impure and analyzes close to 50% NaCN equivalent, whereas good grade sodium cyanide is 90% NaCN, the preferred 0.5 lb. of calcium cyanide per ton would be reduced to approximately 0.25 lb. if sodium cyanide were used.

Following the conditioning period, a vegetable fatty acid collector reagent such as American Cyanamid No. 710 or an anionic sulphonate collector reagent such as a petroleum sulfonic acid (American Cyanamid No. 825) is added at the rate of about 0.80 lb. per ton of solids, and this is conditioned by agitation for approximately two minutes. The vegetable fatty acid collector reagent is preferred because of its lower cost and also because it produces a less voluminous froth.

The anionic sulphonates and vegetable fatty acids have the peculiar property, after proper pulp conditioning, of coating and promoting the flotation of only those calcareous particles which readily react with cold dilute sulphuric acid.

The sulphonate or fatty acid collector is added by stages to prevent an overdose at any one point, and the preferred amount for ores containing 14% Ca is 0.80 lb. per ton for the initial application. The amounts of collector reagents used is reduced in total amounts for ores containing less Ca, and is increased for ores containing higher Ca values. As a practical matter, the amounts per increment remain the same, e.g. 0.80 lb. per ton initially and 0.40 lb. per ton for subsequent increments but the number of subsequent increments is increased or decreased depending upon the Ca content.

Failure to use enough collector reagent will result in insufficient Ca mineral removal during flotation, whereas use of excessive amounts of collector reagent will result in excess bulk of floated concentrate, which, in turn, will lead to a loss of copper in the floated calcareous concentrate.

A light brittle-bubble type frothing reagent, as exemplified by the synthetic alcohols, is then added at the required rate, and the ore slurry submitted to flotation at about 20% solids. A preferred frothing reagent is DowFroth 200 which is added at the rate of from about 0.02 to about 0.05 lb. per ton of solids, and never more than 0.10 lb. per ton.

Although a range of 5% to 40% solids might be considered as a workable range, 20% is more practical than 40%, and a percentage downward from 20% would mean progressively greater capital costs, increased floor space, etc.

As mentioned above, when the froth becomes nearly exhausted, additional sulphonate or fatty acid collector reagent is added at the rate of about 0.40 lb. per ton of solids, the slurry conditioned for about one minute, and flotation is again resumed.

Each time the froth becomes nearly exhausted, an additional amount of collector reagent is added as explained above, and this is repeated as many times as necessary (e.g. four to eight times in tests) in order to remove essentially all acid-consuming gangue particles from the slurry.

As mentioned above, the pH of the slurry should be maintained within a preferred range, both during conditioning and during flotation. Tests (Schedule V) have shown that during flotation a pH range of from about 7.5 to 11.0 is workable but that a pH of about 8.5 achieves the best results.

It has also been determined that the heating of flotation pulps above ambient temperature has proved to be detrimental to clean separations.

At the end of the rough flotation cycle, the floated concentrate is conditioned by agitation with about 0.25 lb. sodium silicate per ton of solids (original tons) and about 0.20 lb. calcium cyanide per ton of solids (original tons) for about five minutes, and re-floated at a density of from about 5% to about 10% solids with no subsequent reagent additions. This reflotation is usually carried out at whatever percentage of solids is contained in the rougher concentrate when it arrives at the cleaner cells, and because comparatively large volumes of water are added to the rougher concentrate to keep it washed down the discharge launders, this rougher concentrate usually arrives at the cleaner cells at 5% to 10% solids.

The tailings from this cleaning stage (cleaner cell tails) are consistently low in acid-consuming gangue constituents and contain an appreciable copper content, and are combined directly with the original rougher tailings to provide the heads to leaching.

The combined rough and clean tailings can then be leached with dilute sulfuric acid at room temperature for one hour with constant agitation. I prefer to use 4% sulfuric acid at 20% solids content.

Of course, the percentage range for sulfuric acid strength can be anything from the weakest strength that would still show a trace of free acid present at the end of the leach, up to a strength that would cause excessive acid consumption on waste gangue constituents.

The action of dilute sulfuric acid is selective toward copper minerals over gangue, but this selectivity is progressively lessened as the acid strength is increased. Thus, lower ranges of acid concentration are more economical as to acid consumption but higher ranges are more efficient as pertains to percentages of copper recovery.

Numerous tests have been run on various ores utilizing the preferred method described above, with excellent results.

Typically, one ore used for testing assayed 1.06% copper, of which 0.05%, or 5% of the total copper, was in the sulphide form.

The floated concentrate assayed 0.40%–0.50% copper and represented one-third of the original heads weight, thus containing 14%–15% of the total original copper.

The flotation tailings assayed 1.30% copper and represented two-thirds of the original heads weight, thus containing 85% of the total original copper in the ore. When the tailings were leached with cold, dilute (4%) sulphuric acid for one hour with constant agitation, the extraction of copper present in the tailings was in the order of 95%. This amounts to about 80% of all of the copper present in the original ore. The net acid consumption was in the order of 80 to 100 lbs. sulphuric acid per ton of solids, or 3.23 lbs. of acid per lb. of copper leached from the flotation tailings.

On the other hand, leaching tests performed on this same ore without flotation separation, resulted in an overall copper extraction of 42.96% and an acid consumption of 306.96 lbs. of sulphuric acid per ton of solids, when also leached at 4.0% acid at 20% solids. When a greater quantity of acid was used, a recovery of 69.5% of the total copper was achieved, but the acid consumption increased to 440 lbs. of sulphuric acid per ton of solids.

This was equivalent to 29.9 lbs. of acid per pound of copper obtained by leaching as compared with the 3.23 lbs. of acid per pound of copper leached from flotation tailings after flotation separation in accordance with the present invention.

With the cost of sulphuric acid at approximately two cents per pound, the economic importance of the described flotation and leaching process is readily apparent.

RESULTS

Extraction of copper in liquor—92.27%
Recovery of copper in original ore—75.38%
Sulphuric acid consumption per lb. of copper leached—2.27 lbs.
Sulphuric acid consumption per ton of solids leached—156.18 lbs.
Sulphuric acid consumption per ton of original ore—125.04 lbs.

TEST NO. 122-P.—LOWER LIME SAMPLE FROM TWIN BUTTES AREA, PIMA COUNTY, ARIZONA

| Product | Weight | Percent Cu | Units | Percent Cu recovered | Percent Ca | Units | Percent Ca recovered |
|---|---|---|---|---|---|---|---|
| Concentrate | 107.9 | 2.14 | 230.9 | 12.93 | 10.88 | 1,174 | 96.47 |
| Cleaner tails | 82.9 | 2.99 | 247.9 } | 87.07 { | 0.40 | 33 } | 3.53 |
| Rougher tails | 294.3 | 4.44 | 1,306.7 } |  | 0.24 | 10 } |  |
| Calc. heads | 485.1 | 3.68 | 1,785.5 | 100.00 | 2.54 | 1,217 | 100.00 |

NOTE.—Above rougher tails and cleaner tails were combined in a weighted composite and leached with 4.0% sulphuric acid, cold, with constant agitation for one hour at 15% solids.

Representative tests made on various ores of the type described above, using the preferred percentages of reagents previously described, are set forth below.

RESULTS

Extraction of copper in liquor—92.5%
Recovery of copper in original ore—80.54%

TEST NO. 12-P.—DAISY ORE, SAN XAVIER AREA, PIMA COUNTY, ARIZONA

| Product | Weight | Percent Cu | Units | Percent Cu recovered | Percent Ca | Units | Percent Ca recovered |
|---|---|---|---|---|---|---|---|
| Concentrate | 160.8 | 0.50 | 80.40 | 15.55 | 27.16 | 4,367 | 65.57 |
| Cleaner tails | 25.4 | 1.38 | 35.052 } | 84.45 { | 6.76 | 172 } | 34.43 |
| Rougher tails | 313.8 | 1.28 | 401.664 } |  | 6.76 | 2,121 } |  |
| Calc. heads | 500.0 | 1.03 | 517.116 | 100.00 | 13.33 | 6,660 | 100.00 |

NOTE.—Above rougher tails and cleaner tails combined in a weighted composite and leached with 4.0% sulphuric acid, with constant agitation for one hour at 20% solids.

RESULTS

Extraction of copper in liquor—94.5%
Recovery of copper in original ore—79.8%
Sulphuric acid consumption per lb. copper leached—3.23 lbs.
Sulphuric acid consumption per ton of solids leached—83.35 lbs.
Sulphuric acid consumption per original ton heads—53.29 lbs.

TEST NO. 17-P.—DAISY ORE, SAN XAVIER AREA, PIMA COUNTY, ARIZONA

| Product | Weight | Percent Cu | Units | Percent Cu recovered | Percent Ca | Units | Percent Ca recovered |
|---|---|---|---|---|---|---|---|
| Concentrate | 167.2 | 0.40 | 66.88 | 13.03 | 28.20 | 4,715 | 69.30 |
| Cleaner tails | 32.8 | 1.39 | 45.59 } | 86.97 { | 10.80 | 354 } | 30.70 |
| Rougher tails | 299.1 | 1.34 | 400.79 } |  | 5.80 | 1,735 } |  |
| Calc. heads | 499.1 | 1.03 | 513.26 | 100.00 | 13.63 | 6,804 | 100.00 |

NOTE.—Above rougher tails and cleaner tails were combined in a weighted composite and leached with 4.0% sulphuric acid, cold, with constant agitation for one hour at 20% solids.

RESULTS

Extraction of copper in liquor—94.49%
Recovery of copper in original ore—82.18%
Sulphuric acid consumption per lb. of copper leached—3.45 lbs.
Sulphuric acid consumption per ton of solids leached—87.24 lbs.
Sulphuric acid consumption per ton of original ore—58.07 lbs.

TEST NO. 150-P.—ORE FROM SOUTH AMERICAN DEPOSIT, HIGH COPPER VALUES

| Product | Weight | Percent Cu | Units | Percent Cu recovered | Percent Ca | Units | Percent Ca recovered |
|---|---|---|---|---|---|---|---|
| Concentrate | 99.7 | 2.10 | 209.37 | 18.31 | 14.56 | 1,452 | 33.91 |
| Cleaner tails | 76.5 | 3.76 | 287.64 } | 81.69 { | 6.76 | 517 } | 67.09 |
| Rougher tails | 323.0 | 3.54 | 1,143.42 } |  | 7.16 | 2,313 } |  |
| Calc. heads | 449.2 | 3.29 | 1,640.43 | 100.00 | 8.58 | 4,282 | 100.00 |

NOTE.—Above rougher tails and cleaner tails combined in a weighted composite and leached with 4.0% sulphuric acid, cold, with constant agitation for one hour at 10% solids.

RESULTS

Extraction of copper in liquor—92.27%
Recovery of copper in original ore—75.38%
Sulphuric acid consumption per lb. of copper leached—2.20 lbs.
Sulphuric acid consumption per ton of solids leached—195.84 lbs.
Sulphuric acid consumption per ton of original ore—152.39 lbs.

SCHEDULE I

Tests to determine optimum percentage of minus 200 mesh particles.

TEST NO. 17-P-3 GROUND TO 35% MINUS 200 MESH

| Product | Weight | Percent Cu | Units | Percent Cu recovered |
|---|---|---|---|---|
| Concentrate | 179.6 | 0.45 | 80.82 | 15.92 |
| Clean tails | 40.0 | 1.42 | 56.80 } | 80.08 |
| Rough tails | 280.4 | 1.32 | 370.128 } |  |
| Head | 500 | 1.015 | 507.748 | 100 |

TEST NO. 17-P, GROUND TO 44.6% MINUS 200 MESH

| Product | Weight | Percent Cu | Units | Percent Cu recovered |
|---|---|---|---|---|
| Concentrate | 167.2 | 0.40 | 66.88 | 13.03 |
| Cleaner tails | 32.8 | 1.39 | 45.59 } | |
| Rougher tails | 299.1 | 1.34 | 400.79 } | 86.97 |
| Head | 499.1 | 1.03 | 513.26 | 100.00 |

TEST NO. 17-P-2, GROUND TO 50.4% MINUS 200 MESH

| Product | Weight | Percent Cu | Units | Percent Cu recovered |
|---|---|---|---|---|
| Concentrate | 180.3 | 0.45 | 81.135 | 15.85 |
| Cleaner tails | 39.6 | 1.40 | 55.44 } | |
| Rougher tails | 280.1 | 1.34 | 375.334 } | 84.17 |
| Head | 500.0 | 1.024 | 511.909 | 100.00 |

SCHEDULE II

Tests to determine optimum conditioning time.

TEST 17-P-9, CONDITIONED 2 MINUTES

| Product | Weight | Percent Cu | Units | Percent Cu recovered | Percent Ca | Units | Percent Ca recovered |
|---|---|---|---|---|---|---|---|
| Concentrate | 196.1 | 0.52 | 101.972 | 21.39 | 25.2 | 4,941.72 | 70.47 |
| Cleaner tails | 32.2 | 1.43 | 46.046 } | | 10.3 | 331.66 } | |
| Rougher tails | 271.7 | 1.21 | 328.757 } | 78.61 | 6.4 | 1,738.88 } | 29.53 |
| Head | 500.0 | 0.954 | 476.775 | 100.00 | 14.02 | 7,012.26 | 100.00 |

TEST 17-P, CONDITIONED 5 MINUTES

| Product | Weight | Percent Cu | Units | Percent Cu recovered | Percent Ca | Units | Percent Ca recovered |
|---|---|---|---|---|---|---|---|
| Concentrate | 167.2 | 0.40 | 66.88 | 13.03 | 28.20 | 4,715 | 69.30 |
| Cleaner tails | 32.8 | 1.39 | 45.59 } | | 10.80 | 354 } | |
| Rougher tails | 299.1 | 1.34 | 400.79 } | 86.97 | 5.80 | 1,735 } | 30.70 |
| Head | 499.1 | 1.03 | 513.26 | 100.00 | 13.63 | 6,804 | 100.00 |

TEST 17-P-8, CONDITIONED 10 MINUTES

| Product | Weight | Percent Cu | Units | Percent Cu recovered | Percent Ca | Units | Percent Ca recovered |
|---|---|---|---|---|---|---|---|
| Concentrate | 150.4 | 0.38 | 57.152 | 11.46 | 29.0 | 4,361.60 | 64.72 |
| Cleaner tails | 26.6 | 1.42 | 37.772 } | | 14.1 | 376.06 } | |
| Rougher tails | 323.0 | 1.25 | 403.750 } | 88.54 | 6.2 | 2,002.60 } | 35.28 |
| Head | 500.0 | 0.997 | 498.674 | 100.00 | 13.48 | 6,739.26 | 100.00 |

SCHEDULE III

Tests to determine optimum amount of sodium silicate.

TEST NO. 17-P-16, 0.2 LB. SODIUM SILICATE PER TON

| Product | Weight | Percent Cu | Units | Percent Cu recovered | Percent Ca | Units | Percent Ca recovered |
|---|---|---|---|---|---|---|---|
| Concentrate | 196.0 | 0.56 | 109.76 | 22.90 | 28.2 | 5,527.20 | 72.14 |
| Cleaner tails | 32.0 | 1.35 | 43.20 } | | 10.6 | 339.20 } | |
| Rougher tails | 272.0 | 1.20 | 326.40 } | 77.10 | 6.6 | 1,795.20 } | 27.86 |
| Head | 500.0 | 0.959 | 479.36 | 100.00 | 15.32 | 7,661.60 | 100.00 |

TEST NO. 17-P, 0.5 LB. SODIUM SILICATE PER TON

| Product | Weight | Percent Cu | Units | Percent Cu recovered | Percent Ca | Units | Percent Ca recovered |
|---|---|---|---|---|---|---|---|
| Concentrate | 167.2 | 0.40 | 66.88 | 13.03 | 28.20 | 4,715 | 69.30 |
| Cleaner tails | 32.8 | 1.39 | 45.59 } | | 10.80 | 354 } | |
| Rougher tails | 299.1 | 1.34 | 400.79 } | 86.97 | 5.80 | 1,735 } | 30.70 |
| Head | 499.1 | 1.03 | 513.26 | 100.00 | 13.63 | 6,804 | 100.00 |

TEST NO. 17-P-15, 1.0 LB. SODIUM SILICATE PER TON

| Product | Weight | Percent Cu | Units | Percent Cu recovered | Percent Ca | Units | Percent Ca recovered |
|---|---|---|---|---|---|---|---|
| Concentrate | 148.1 | 0.40 | 59.240 | 11.53 | 30.0 | 4,443.0 | 63.72 |
| Cleaner tails | 36.1 | 1.40 | 50.540 } | | 10.6 | 382.66 } | |
| Rougher tails | 315.8 | 1.28 | 404.224 } | 88.47 | 6.8 | 2,147.44 } | 36.28 |
| Head | 500.0 | 1.028 | 514.004 | 100.0 | 13.95 | 6,973.10 | 100.00 |

SCHEDULE IV

Tests to determine optimum amount of water-soluble cyanide.

TEST NO. 17-P-22, 0.1 LB. CALCIUM CYANIDE PER TON

| Product | Weight | Percent Cu | Units | Percent Cu recovered | Percent Ca | Units | Percent Ca recovered |
|---|---|---|---|---|---|---|---|
| Concentrate | 180.4 | 0.74 | 133.50 | 27.03 | 28.0 | 5,051.20 | 69.21 |
| Cleaner tails | 36.2 | 1.50 | 54.30 } | | 10.4 | 376.48 } | |
| Rougher tails | 283.4 | 1.08 | 306.07 } | 72.97 | 6.6 | 1,870.44 } | 30.79 |
| Head | 500.0 | 0.987 | 493.87 | 100.00 | 14.60 | 7,298.12 | 100.00 |

TEST NO. 17-P, 0.5 LB. CALCIUM CYANIDE PER TON

| Product | Weight | Percent Cu | Units | Percent Cu recovered | Percent Ca | Units | Percent Ca recovered |
|---|---|---|---|---|---|---|---|
| Concentrate | 167.2 | 0.40 | 66.88 | 13.03 | 28.20 | 4,715 | 69.30 |
| Cleaner tails | 32.8 | 1.39 | 45.59 | 86.97 | 10.80 | 354 | 30.70 |
| Rougher tails | 299.1 | 1.34 | 400.79 | | 5.80 | 1,735 | |
| Head | 499.1 | 1.03 | 513.26 | 100.00 | 13.63 | 6,804 | 100.00 |

TEST NO. 17-P-23, 1.0 LB. CALCIUM CYANIDE PER TON

| Product | Weight | Percent Cu | Units | Percent Cu recovered | Percent Ca | Units | Percent Ca recovered |
|---|---|---|---|---|---|---|---|
| Concentrate | 160.9 | 0.40 | 64.360 | 12.52 | 28.2 | 4,537.38 | 65.95 |
| Cleaner tails | 34.7 | 1.38 | 47.886 | 87.48 | 10.5 | 364.35 | 34.05 |
| Rougher tails | 304.4 | 1.32 | 401.808 | | 6.5 | 1,978.60 | |
| Head | 500.00 | 1.028 | 514.054 | 100.00 | 13.76 | 6,880.33 | 100.00 |

SCHEDULE V

Tests to determine optimum pH during flotation.

TEST 17-P-33, pH MAINTAINED AT 7.5

| Product | Weight | Percent Cu | Units | Percent Cu recovered | Percent Ca | Units | Percent Ca recovered |
|---|---|---|---|---|---|---|---|
| Concentrate | 120.8 | 0.42 | 50.736 | 9.30 | 24.6 | 2,971.68 | 48.81 |
| Cleaner tails | 20.2 | 1.40 | 28.280 | 90.70 | 10.3 | 208.06 | 51.19 |
| Rougher tails | 359.0 | 1.30 | 466.700 | | 8.1 | 2,907.90 | |
| Head | 500.00 | 1.09 | 545.716 | 100.00 | 12.18 | 6,087.64 | 100.00 |

TEST 17-P, pH MAINTAINED AT 8.5

| Product | Weight | Percent Cu | Units | Percent Cu recovered | Percent Ca | Units | Percent Ca recovered |
|---|---|---|---|---|---|---|---|
| Concentrate | 167.2 | 0.40 | 66.88 | 13.03 | 28.20 | 4,715 | 69.30 |
| Cleaner tails | 32.8 | 1.39 | 45.59 | 86.97 | 10.80 | 354 | 30.70 |
| Rougher tails | 299.1 | 1.34 | 400.79 | | 5.80 | 1,735 | |
| Head | 499.1 | 1.03 | 513.26 | 100.00 | 13.63 | 6,804 | 100.00 |

TEST 17-P-34, pH MAINTAINED AT 11.0

| Product | Weight | Percent Cu | Units | Percent Cu recovered | Percent Ca | Units | Percent Ca recovered |
|---|---|---|---|---|---|---|---|
| Concentrate | 201.1 | 0.70 | 140.770 | 27.79 | 26.6 | 5,349.26 | 70.38 |
| Cleaner tails | 19.6 | 0.99 | 19.404 | 72.21 | 15.1 | 295.96 | 29.62 |
| Rougher tails | 279.3 | 1.24 | 346.332 | | 7.0 | 1,955.10 | |
| Head | 500.00 | 1.013 | 506.506 | 100.00 | 15.20 | 7,600.32 | 100.00 |

I claim as my invention:

1. A method of preparing a calcareous oxidized copper ore for acid leaching, said ore containing copper minerals predominantly in oxidized form, calcareous substances which readily react with cold dilute $H_2SO_4$ and mineral substances which do not readily react with cold dilute $H_2SO_4$, comprising the steps of:
   forming a water slurry of said ore in which the ore particles are substantially all −48 mesh size,
   adding water soluble silicate and cyanide conditioning reagents to the slurry to disperse the particles and to depress the copper minerals;
   adding a fatty acid or an anionic sulfonate collector reagent to the conditioned slurry to selectively coat and promote the flotation of those calcareous substances which react readily with cold dilute $H_2SO_4$;
   submitting the slurry to flotation;
   and removing a floated fraction containing a major part of the calcareous substances which react readily with cold dilute $H_2SO_4$ and having a copper assay value lower than that of the original ore from a tailing fraction containing a major part of the copper minerals and of the substances which do not readily react with cold dilute $H_2SO_4$.

2. The method of claim 1 in which the slurry includes ore slimes and the slimes are left in the flotation feed.

3. The method defined in claim 1 in which the pH of the slurry is maintained between about 8.0 and about 9.0 during conditioning and during flotation.

4. The method defined in claim 1 in which the slurry is maintained at about 20% solids during conditioning and during flotation.

5. The method defined in claim 1 in which the water-soluble cyanide is calcium cyanide.

6. The method defined in claim 1 in which a frothing agent is added prior to submitting the ore to flotation.

7. A method of preparing a calcareous oxidized copper ore for acid leaching, said ore containing copper minerals predominantly in oxidized form, calcareous substances which readily react with cold dilute $H_2SO_4$ and calcareous and noncalcareous substances which do not readily react with cold dilute $H_2SO_4$, comprising the steps of:
   forming a water slurry of said ore in which the ore particles are substantially all −48 mesh size, said slurry including ore slimes;
   adding water soluble silicate and cyanide conditioning reagents to the slurry to disperse the particles and to depress the copper minerals;
   adding a vegetable fatty acid or an anionic sulfonate collector reagent to the conditioned slurry to selectively coat and promote the flotation of those calcareous substances which react readily with cold dilute $H_2SO_4$;
   adding a frothing agent and submitting the slurry to flotation; and
   removing the floated fraction containing a major part of the calcareous substances which react readily with cold dilute $H_2SO_4$ and having a copper assay value lower than that of the original ore from the tailing fraction containing a major part of the copper mineral and of the calcareous and non-calcareous substances which do not react readily with cold dilute $H_2SO_4$.

8. The method of preparing calcareous oxidized copper ores for acid leaching, said ores containing copper minerals predominantly in oxidized form, a high acid-consuming calcareous fraction and a low acid-consuming fraction, which includes the steps of:

grinding the ore using soft water to substantially all minus 48 mesh;

adding to the slurry sodium silicate and a water-soluble cyanide and a vegetable fatty acid or an anionic sulfonate collector reagent in amounts to cause collector coatings to form on the high acid-consuming particles and to deter the formation of such coatings on the copper minerals and the low acid-consuming particles;

submitting the slurry to flotation; and removing the floated fraction containing a major part of the high acid-consuming calcareous fraction from a tailings fraction containing a major part of the copper minerals and of the low acid-consuming particles.

9. The method defined in claim 8 in which a frothing agent is added prior to submitting the ore to flotation.

10. The method of preparing calcareous oxidized copper ores for acid leaching, said ores containing copper minerals predominantly in oxidized form, which includes the steps of:

grinding the ore using soft water to substantially all minue 48 mesh;

adding to the pulp from about 0.2 to about 1.0 pound of sodium silicate per ton of solids and from about 0.1 to about 1.0 pound of a water-soluble cyanide per ton of solids;

adding about 0.80 pound per ton of solids of a vegetable fatty acid or an anionic sulphonic collector reagent;

adding a light brittle-bubble type frothing agent in an amount of about 0.02 to about 0.05 pound per ton of solids and submitting the slurry to flotation; and removing the floated fraction containing a major part of the high acid-consuming calcareous fraction from a tailings fraction containing a major part of the copper minerals and of the low acid-consuming particles.

11. The method defined in claim 10 in which additional amounts of collector reagent, in an amount of about 0.40 pound per ton of solids, are added during flotation each time the froth becomes nearly exhausted, until substantially all acid-consuming gangue particles are floated from the slurry.

12. The method defined in claim 10 in which the floated fraction is removed and further conditioned with small amounts of sodium silicate and calcium cyanide; the floated fraction is refloated at a density of from about 5% to about 10% solids; the clean tailings from the reflotation containing concentrated amounts of copper minerals are combined with the rough tailings; and the combined tailings are leached with dilute sulfuric acid.

References Cited

UNITED STATES PATENTS

| | | | |
|---|---|---|---|
| 955,012 | 4/1910 | Sulmon | 209—166 |
| 1,291,824 | 1/1919 | Gahl | 209—166 X |
| 1,671,698 | 5/1928 | Carnahan | 209—166 |
| 1,843,526 | 2/1932 | Tucker | 209—166 |
| 1,972,247 | 9/1934 | Sayre | 209—166 |
| 2,069,365 | 2/1937 | Handy | 209—166 X |
| 2,106,800 | 2/1938 | Fischer | 209—167 |
| 2,231,265 | 2/1941 | Gaudin | 209—167 |
| 2,620,068 | 12/1952 | Allen | 209—167 |

FRANK D. LUTTER, Primary Examiner

R. HALPER, Assistant Examiner

U.S. Cl. X.R.

209—3, 167; 241—20

UNITED STATES PATENT OFFICE
CERTIFICATE OF CORRECTION

Patent No. 3,528,784        Dated September 15, 1970

Inventor(s) George E. Green

It is certified that error appears in the above-identified patent and that said Letters Patent are hereby corrected as shown below:

Column 2: Line 53, "110:1" should read --100:1--.

Column 7: Test No. 12-P, line 34, second line of Note, after "acid," insert --cold,--;

Test No. 150-P, under subheading Weight, last line, "449.2" should read --499.2--.

Schedule I: Test No. 17-P-3, last column, "80.08" should read --84.08--.

Column 13: Claim 10, line 24, "minue" should read --minus--.
Claim 10, line 30, "sulphonic" should read --sulphonate--.

Signed and sealed this 6th day of April 1971.

(SEAL)
Attest:

EDWARD M. FLETCHER, JR.
Attesting Officer

WILLIAM E. SCHUYLER, JR.
Commissioner of Patents